March 1, 1960
N. N. SKAREDOFF
2,926,506
FUEL VAPOR RECOVERY UNIT
Filed Feb. 4, 1958
3 Sheets-Sheet 1
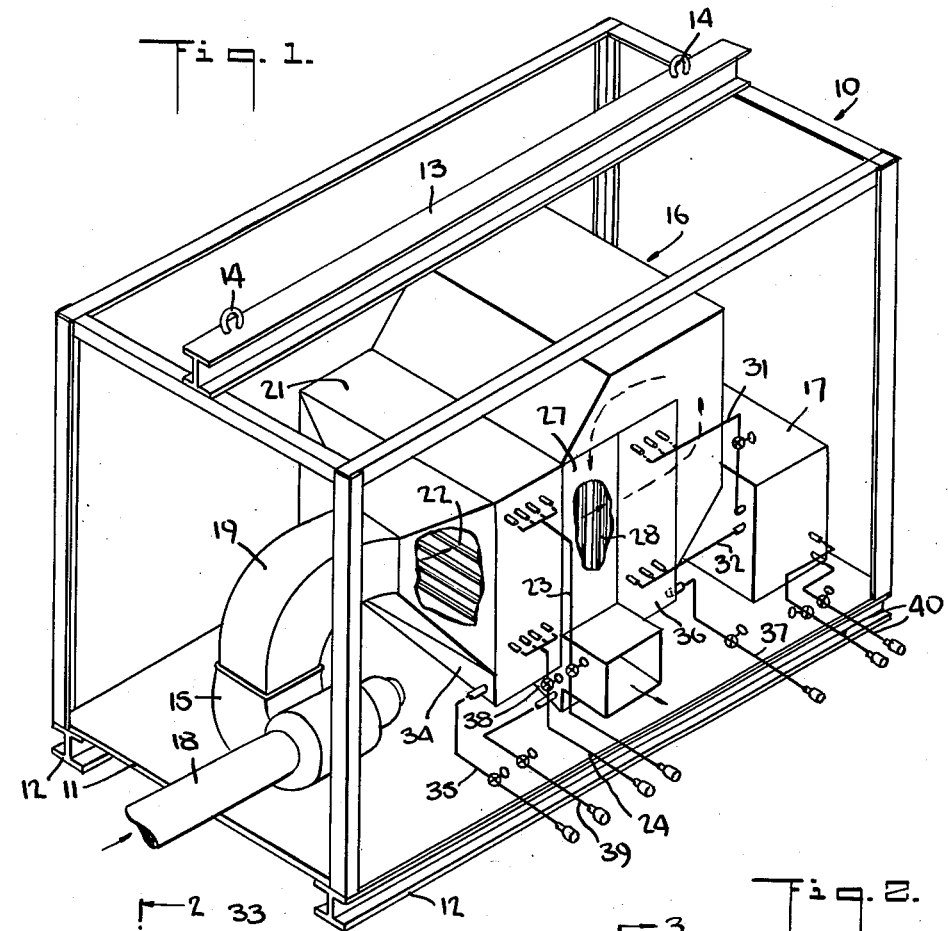
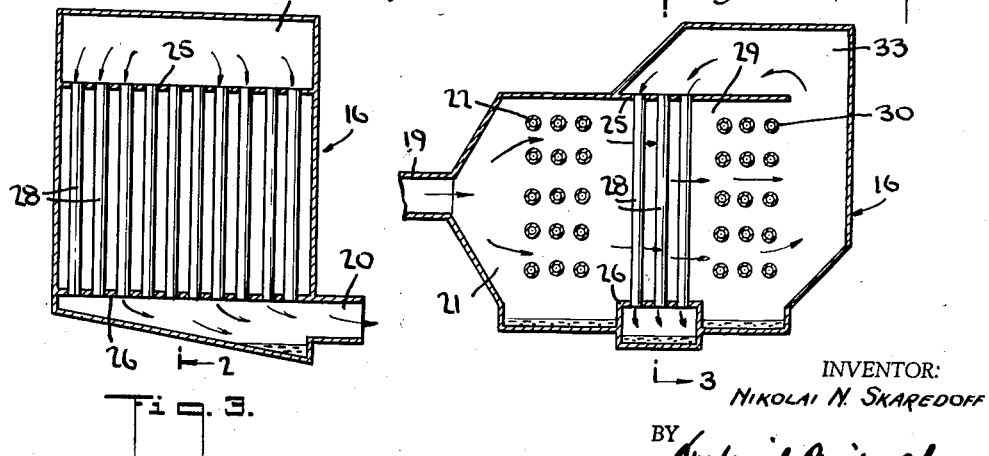
INVENTOR:
NIKOLAI N. SKAREDOFF
BY
Frederick Geitenfeld
ATTORNEY

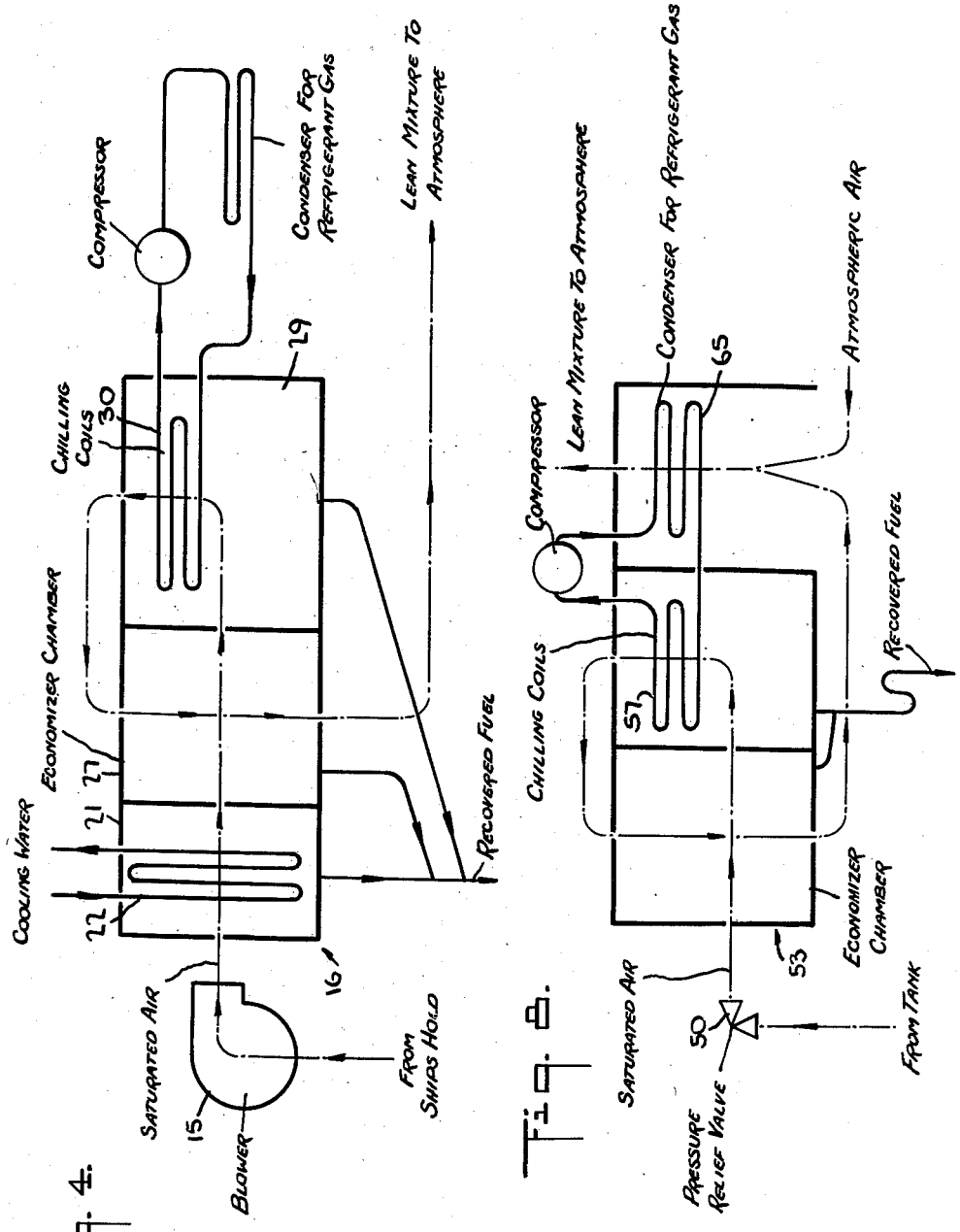

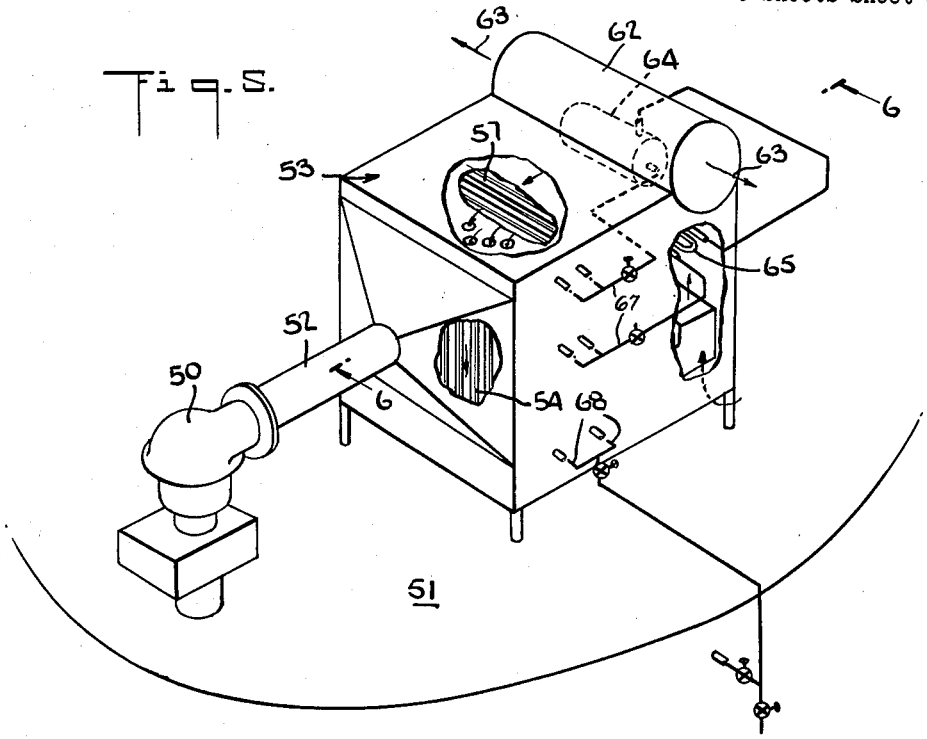
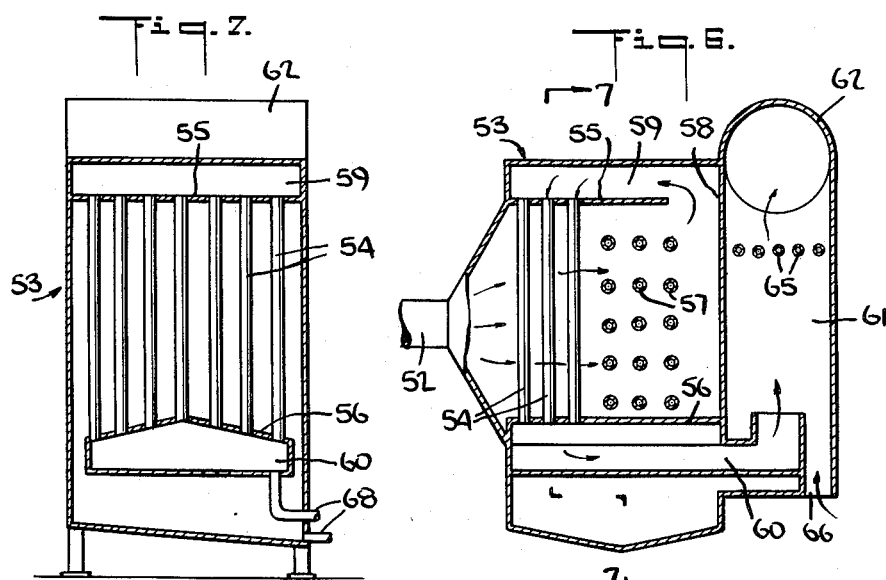

United States Patent Office 2,926,506
Patented Mar. 1, 1960

2,926,506

FUEL VAPOR RECOVERY UNIT

Nikolai N. Skaredoff, Port Washington, N.Y., assignor to Devenco Incorporated, New York, N.Y., a corporation of New York Application February 4, 1958, Serial No. 713,234

2 Claims. (Cl. 62—259)

This invention relates generally to the handling of volatile liquids, such as gasolines, and has particular reference to an improved means for condensing and thereby salvaging vapors of the liquid from vapor-laden air.

The invention is primarily intended for the recovery of gasoline vapors, but it is obviously applicable to the handling of any liquids whose commercial value is sufficiently great to justify the recovery of its vapors.

Large losses are suffered annually by the evaporation of gasoline from storage tanks. Such evaporative loss occurs, for example, during "breathing" that takes place as a result of moment-to-moment changes in atmospheric temperature and pressure. The vapor pressure of highly volatile liquids increases rapidly with temperature rise. Ordinary storage tanks or tanker ships are not designed to withstand internal pressure conditions that are greater than or less than the outside pressure of the atmosphere, and therefore a continuous venting takes place whereby every rise in atmospheric temperature expels a quantity of air saturated with the valuable vapor, and with every drop in temperature a quantity of outside air is admitted to the tank only to be saturated with the vapor and subsequently to be expelled again on the occasion of the next temperature rise.

Similar losses occur when a tank or vessel is being filled with a product. The space above the liquid level becomes saturated with vapor, and as the level rises there is an expulsion of vapor-laden air to the atmosphere. This is a condition common to both shore tanks and tanker ships.

An important loss of valuable vapors commonly occurs whenever a tanker ship is unloaded. For safety reasons, and also to make it possible for workmen to enter the hold of such a ship after emptying, a thorough ventilation of the entire ship is required. This is commonly achieved by blowing outside air through canvas ducts to the bottom of the ship's hold, whereby the vapor-laden air is expelled. The vapors lost during such a procedure are of substantial value.

It is a general object of this invention to provide new and improved equipment, in the form of a relatively compact and unitary assemblage of elements, for salvaging vapors under conditions of the character mentioned. Moreover, the invention aims to provide this equipment in a form which makes it thoroughly practical, simple to manufacture and assemble, inexpensive to operate, and efficient in achieving the desired purpose.

A more particular object of the invention is to provide a unit of this kind, in which the vapors to be recovered are efficiently condensed by a chilling action. The invention therefore involves a refrigerating apparatus, chilling coils to which the apparatus supplies an adequate refrigerating medium, and a unique design of associated flow chambers within a common housing through which the vapor-laden air is guided and from which the condensed vapors are readily recoverable.

The design of the equipment is predicated upon tests which demonstrate that for most of the common gasolines 90% of suspended vapors will be precipitated in liquid form if the temperature of saturated vapor-laden air is dropped from 100° F. to 10° F.

Another and more particular object of the invention is to provide the several elements of the equipment in a form and in an assembled relation that defines a readily portable unit. Such a unit is especially useful on ships, where cooling water and electrical energy at common voltages is directly available.

Another objective is to provide an apparatus which is thermally efficient, hence highly effective in achieving the desired condensation of vapors to be recovered, and economical to operate.

Several ways of achieving these general objectives and advantages, and such other benefits as may hereinafter appear or be pointed out, are illustratively exemplified in the accompanying drawing, in which:

Figure 1 is a perspective view with parts broken away to reveal the interior, and other parts indicated diagrammatically, of a portable unit of equipment embodying the features of this invention;

Figure 2 is a fragmentary cross-sectional view substantially along the line 2—2 of Figure 3;

Figure 3 is a fragmentary cross-sectional view substantially along the line 3—3 of Figure 2;

Figure 4 is a flow-sheet indicating the nature and operation of the equipment shown in Figures 1–3;

Figure 5 is a view similar to Figure 1 indicating a modification;

Figure 6 is a fragmentary cross section substantially along the line 6—6 of Figure 5;

Figure 7 is a fragmentary cross section substantially along the line 7—7 of Figure 6; and Figure 8 is a flow-sheet showing the operation of the unit illustrated in Figures 5–7.

In Figure 1, I have shown an illustrative single supporting framework 10 within which equipment of the present character is supported. The framework shown is substantially rectangular, and is provided with a floor 11 and parallel feet or supports 12. At the top, a beam 13 is provided with eyes 14 by means of which the entire unit can be lifted and transported from place to place. The details of the supporting frame are not essential, and may be different from those illustrated. The frame should be of a character to permit it to be rested upon the deck of a tanker ship, adjacent to an outlet from the hold which is to be ventilated and from which gasoline vapors are to be salvaged.

Mounted within this unit, and supported in appropriate ways (not shown), are a blower 15, a housing 16 having walls and partitions shaped and arranged to define a series of chambers presently to be described, and a refrigerating apparatus or unit 17. The blower 15 may be any conventional kind, and the pipe 18 connected to its inlet may be of canvas or the like and is adapted for connection to the outlet (not shown) from the ship's hold. The blower 15 is connected by a conduit 19 to the inlet of the housing 16. This housing is also provided with an air outlet 20.

Referring now to Figure 2, it would be observed that the conduit 19 directs the vapor-laden air to a first chamber 21 in which there are a series of cooling coils 22. Projecting from the housing are pipes 23 and 24 provided with connectors adapted to be hooked up to a supply of cooling water and to a discharge, respectively. Any hydrant adapted to deliver sea water is adequate for the purpose, and the discharge line may obviously be directed overboard, if desired.

The interior housing walls or partitions 25 and 26, arranged in substantially parallel horizontal planes, define the floor and ceiling of a second chamber 27, directly adjacent to the chamber 21. Within the chamber 27 there are two passes arranged in heat exchanging relation. In the device illustrated one of the passes consists of vertically extending tubes 28 projecting through the partitions 25, 26, and the other of the passes consists of the space surrounding the tubes.

Directly adjacent to the chamber 27 there is a chamber 29 within which a plurality of chilling coils is arranged. A refrigerant gas is supplied to these coils, and withdrawn from them, through pipes 31 and 32 leading to the refrigerating apparatus 17.

Beyond the chamber 29 the housing walls are contoured to define a passage 33 extending upwardly above the partition wall 25.

The nest of tubes 28 communicate at the bottom with the outlet space leading to the outlet 20, at best indicated in Figure 3.

From the foregoing description it will be apparent that the blower 15 directs vapor-laden air from a ship hold to the pre-chilling chamber 21, then in a substantially horizontal direction through the economizer chamber 27, then over the chilling coils 30, then through the passage 33 and downwardly through the tubes 28 to the outlet. During this flow of air, entrained fuel vapor is condensed and dropped out, and the air leaving the device through the outlet 20 is substantially de-vaporized.

The condensed liquid is accumulated in reservoirs arranged at the bottom ends of the several chambers, and withdrawn through outlet pipes provided for this purpose. For example, there is a reservoir 34 at the bottom of the chamber 21, and an outlet pipe 35 leading from it. There is a similar reservoir 36 at the bottom end of the chamber 29, and an outlet pipe 37 leading from it. Similarly, a reservoir 38 is formed in the bottom of the outlet chamber, and a drain pipe 39 leads from it. The floors of the reservoirs are approximately shaped, and I have illustratively shown them slanting downwardly toward the outlet.

Any water vapor that is condensed out with the gasoline may be separated from the salvaged fuel at a subsequent stage of accumulation of the latter.

The refrigerating apparatus 17 has not been shown in detail, since it may consist of any conventional type commonly employed for air conditioning purposes. In the illustrated device this unit is of the water-cooled variety, and the pipes 40 are those through which the cooling water flows on its way to and from the condenser (not shown) for the refrigerant gas.

The unit shown in Figures 1-4 is primarily intended for use on a tanker ship, as will be understood from the description given. Of course its utility is not limited to such a purpose, and it may be used to advantage wherever substantial quantities of vapor-laden air are to be treated, and where cooling water is readily and inexpensively available. By means of the equipment shown, air in quantities up to thousands of cubic feet per minute may be devaporized expeditiously and efficiently. By initially introducing the air to the chamber in which the water-cooled coils are arranged, a large part of the heat is removed at once. As this pre-cooled air passes around the economizer tubes 28 a further chilling is effected, and it is at this stage that most of the entrained water vapor is precipitated. Thus, the economizer chamber not only increases the efficiency of the unit as a whole, thereby reducing the size of the refrigerating apparatus, but also avoids frosting of the chilling coils 30.

While the device has been described in the form of a portable piece of equipment adapted for temporary installation upon the deck of a ship, it should be understood that the installation may be of a more permanent character, if desired, and may be operated at fractional capacity during voyages of the ship, to recover gasoline vapors that would otherwise be lost as a result of "breathing."

The embodiment of the invention illustrated in Figures 5-8 is intended primarily for permanent installation on the roof of a tank, whether on shipboard or on land. Here too, however, the device as a whole may be made portable, if desired, since the housing and the various elements are so designed and assembled as to form a single unitary piece of equipment.

In Figures 5-8 I have shown the applicability of the invention to an installation in which relatively small quantities of vapor-laden air are to be treated, and in which the use of cooling water is dispensed with. The reference numeral 50 is intended to designate the conventional venting and vacuum-breaker valve on the roof of the storage tank 51. As is known, minute pressures of between one to four pounds per square inch, gauge, are sufficient to operate the relief valve, whereupon relatively minute quantities of air pass through the conduit 52 to the inlet of the common housing 53. The external and internal walls of this housing define a series of chambers, the first of which is the economizer chamber in which one pass is the nest of vertical tubes 54 and the other pass is the space surrounding them. The tubes 54 project through parallel partition walls 55 and 56. Directly adjacent to the economizer chamber is the bank of chilling coils 57 through which a refrigerant gas is directed. The vertical wall 58 deflects the air flow through a passage 59, thence downwardly through the tubes 54 to a passage 60 which leads the air to the bottom end of a vertical flue or chamber 61. At its upper end the chamber 61 may be rounded over as indicated at 62 to allow the lean air mixture to escape to the atmosphere in the lateral directions indicated by the arrows 63 in Figure 5.

The refrigerating apparatus is in this case mounted in its entirety within the common housing 53, and includes a compressor 64 and a condenser 65 for the refrigerant gas. The condenser 65 is mounted within the flue 61, whereby the chilled lean mixture may be used to advantage. Since the air flow through the device may be relatively small, an auxiliary inlet to the flue 61 is provided at 66 (Figure 6).

As indicated in Figure 5, pipes 67 lead the refrigerant gas to and from the chilling coils 57.

Collection reservoirs are arranged at the bottom ends of the several chambers, as hereinbefore described, and drain pipes 68 lead away the recovered condensed liquid. The floors of the several reservoir chambers may be slanted in appropriate manner, as will be readily understood.

The operation and thermal efficiency of the device of Figures 5-8 will be apparent from the description heretofore given in connection with Figures 1-4.

It may be observed that an installation of the type illustrated may be confined to a space having a volume of only one cubic yard, or even less, for a standard storage tank having a capacity up to about ten thousand barrels. It will be apparent, therefore, that at relatively low cost and with a minimum of operating expense, the invention affords a simple and thoroughly practical means for recovering valuable vapors that would otherwise be lost.

In general, it is to be understood that many of the details herein described and illustrated may be modified by those skilled in the art without necessarily departing from the spirit and scope of the invention as expressed in the appended claims.

What is claimed is:

1. A fuel vapor recovery unit for installation on the roof of a tank having an outlet through which vapor-laden air emanates in small amounts under the control of a pressure relief valve, comprising an economizer chamber provided with a pair of passes arranged in heat exchanging relation, one of said passes being horizontal and the other vertical, a chilling chamber adjacent thereto and provided with chilling coils, a vertically disposed flue chamber open to the atmosphere at its upper end and communicating at its lower end with the lower end of the vertical economizer pass, a refrigerating apparatus for supplying a condensable refrigerant gas to said chilling coils, said apparatus including a nest of condenser tubes for said gas located within said flue chamber, a common housing enclosing said chambers and refrigerating apparatus, means on said housing adapted for connection to said relief valve to guide the vapor-laden air from said valve to the horizontal pass of the economizer chamber, guiding walls formed in said housing to direct said air from said pass over said chilling coils, then downwardly through the vertical pass of the economizer chamber, and then to the lower end of said flue chamber whereby the now vapor-free air is drawn upwardly through said flue and discharged to the atmosphere, and collection reservoirs in said housing positioned to accumulate fuel that has condensed during said air flow.

2. The apparatus according to claim 1 wherein said flue chamber has an opening at its lower end through which atmospheric air is admitted for flow with the vapor-free air over said condenser tubes.

References Cited in the file of this patent

UNITED STATES PATENTS

| | | |
|---|---|---|
| 910,525 | Gardner | Jan. 26, 1909 |
| 1,870,460 | Lambert | Aug. 9, 1932 |
| 2,166,283 | Betz | July 18, 1939 |
| 2,682,758 | Harris | July 6, 1954 |
| 2,811,842 | Taylor | Nov. 5, 1957 |